United States Patent [19]
Bücker

[11] 3,783,800
[45] Jan. 8, 1974

[54] DRYING TROLLEYS FOR BRICKS AND OTHER ARTICLES

[75] Inventor: Franz Bücker, Laggenbeck, Germany

[73] Assignee: C. Keller U. Co., Laggenbeck, Germany

[22] Filed: Feb. 10, 1972

[21] Appl. No.: 225,170

[30] Foreign Application Priority Data
Nov. 23, 1971  Germany............... P 21 57 996.4

[52] U.S. Cl. .............................................. 108/53
[51] Int. Cl. .......................................... B65d 19/38
[58] Field of Search .......................... 108/51–58; 206/65, 66; 280/33.99

[56] References Cited
UNITED STATES PATENTS

| | | | |
|---|---|---|---|
| 2,791,325 | 5/1957 | Schecter et al. | 206/65 |
| 3,154,197 | 10/1964 | Tweed | 211/126 |
| 3,170,415 | 2/1965 | Svolokos | 108/27 |
| 3,180,288 | 5/1965 | McCowan | 108/101 |
| 3,193,093 | 7/1965 | Hansen | 206/62 |
| 3,400,671 | 9/1968 | Erismann | 108/53 |
| 3,523,694 | 8/1970 | Oliver | 280/33.99 |
| 3,536,016 | 10/1970 | Chesley | 108/111 |

FOREIGN PATENTS OR APPLICATIONS
93,547  8/1962  Denmark ............... 108/53

*Primary Examiner*—Paul R. Gilliam
*Attorney*—Mason, Mason & Albright

[57] ABSTRACT

A trolley for drying bricks in a drier comprises a demountable stack of pallets. The stack comprises first and second sets of pallets alternately arranged. When the pallets of the two sets are arranged in the same configuration, adjacent pallets are spaced apart by equal distances, and when the pallets of the two sets are arranged in different configurations, each pallet o the second set rests on the frame of an adjacent lower pallet of the first set. In this manner, the distance between adjacent tier of pallets is increased.

3 Claims, 5 Drawing Figures

DRYING TROLLEYS FOR BRICKS AND OTHER ARTICLES

BACKGROUND OF THE INVENTION

1. Field of the invention

The invention relates to a trolley for bricks and other articles to be treated in a drier, the trolley consisting of individual pallets spaced apart by means of distance pieces attached to them.

2. Description of the prior art

For conveying ceramic ware through a tunnel drier, it has been proposed to use trolleys consisting of a number of stacked pallets. At the corner portion of each two opposite sides of the pallets, distance pieces are fitted, through which the pallets bear on one another, so that the pallets are spaced apart by a distance governed by the depth of the distance pieces. These previously proposed trolleys are disadvantageous in that the spacing between adjacent pallets, is fixed with the result that the spacing must be sufficient to accommodate the tallest articles likely to be dried; thus, excessive space remains between adjacent pallets when smaller articles are being dried. The result is that the trolley and hence also the drier are not always utilized to the fullest extent.

SUMMARY OF THE INVENTION

According to the invention, there is provided in a trolley, first pallets, and second pallets, said pallets being arranged in a demountable stack, and each pallet comprising an article-supporting frame having corners and a pair of opposite sides, and distance pieces at opposite sides of the frame, in each said first pallet the distance pieces projecting at right angles above and below the frame, and in each said second pallet the distance pieces being of a length approximately equal to the depth of the frame, and in each said pallet some of the distance pieces lying adjacent the corners of the frame and other distance pieces being spaced from the corners of the frame.

According to another feature of the invention, the connection between the individual pallets is of plug and socket type.

By rotation of the pallets from which the distance pieces do not project, the spacing between the pallets can be changed, so that the optimum number of both small and large articles can be carried, enabling the trolley and drier to be utilized to the full.

In addition, by resting the pallets on one another in pairs, the stability of the trolley is increased, since the load is necessarily heavier, of course, when larger articles are being dealt with.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

Figure 1:
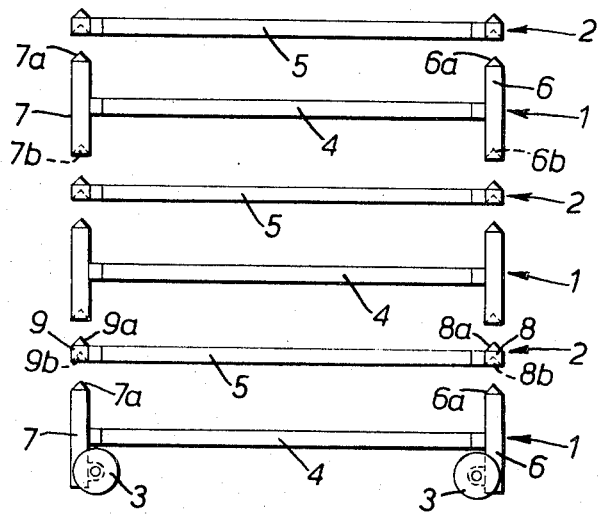
FIG. 1 is an exploded side elevation of a trolley in accordance with the invention.

As shown in the drawings, a drying trolley comprises a number of pallets 1 and 2, which can be demountably stacked together, the lowermost pallet 1 being suitably equipped with rollers or wheels 3, and the pallets 2 alternating with the pallets 1.

Each pallet 1 comprises a rectangular article-supporting frame 4 with a respective pair of distance pieces 6 and 7 mounted on opposite sides of the frame 4, suitably the shorter sides of the frame 4. The distance pieces 6 and 7 each extend above and below the frame 4, the distance pieces 6 being located immediately adjacent a corner of the frame 4, and the distance pieces 7 being spaced from a corner of the frame 4.

Each pallet 2 comprises a rectangular article-supporting frame 5 with a respective pair of distance pieces 8 and 9 mounted on opposite sides of the frame 5, again suitably the shorter sides of the frame 5. The distance pieces 8 and 9 are of the same thickness as the frame 5 and therefore do not extend above or below the frame 5; the distance pieces 8 are located immediately adjacent a corner of the frame 5 in an equivalent position to that of the distance pieces 6, and the distance pieces 9 are spaced from a corner of the frame 4 in an equivalent position to that of the distance pieces 7.

The distance pieces 6, 7, 8 and 9 have conical plugs or pegs 6a, 7a, 8a and 9a, extending from their upper ends and conical sockets or recesses 6b, 7b, 8b and 9b, in their lower end portions. These provide connections of the plug and socket type, by which the individual pallets 1 and 2 can be assembled or stacked and taken apart or unstacked.

Figure 2:
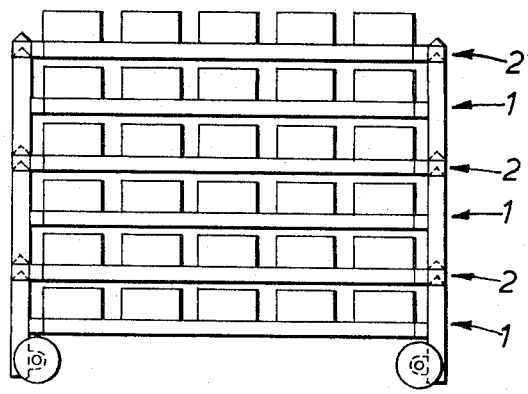
FIG. 2 is a side elevation of the trolley arranged in a configuration suitable for carrying normal sized articles.
Figure 3:
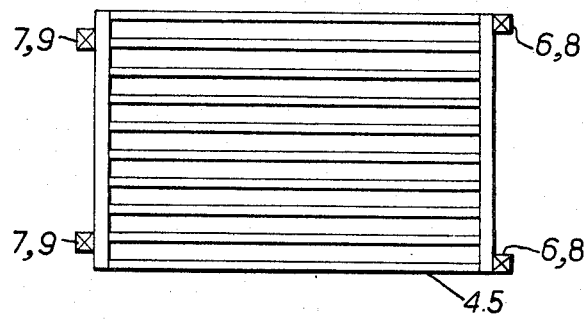
FIG. 3 is a plan of the trolley arranged as shown in FIG. 2.

The production program of a brickworks normally consists of bricks or other articles of different sizes. To enable the drying space to be utilized to the full, it must be possible to alter the vertical spacing between the individual pallets of the drying trolley. In the drying trolley particularly described, this is effected as follows:

When articles of normal size are being carried as shown in FIG. 2, the pallets 2 are so oriented in relation to the pallets 1 that the distance pieces 8 are aligned with the distance pieces 6 of the adjacent pallets 1, and that distance pieces 9 are aligned with the distance pieces 7 of the adjacent pallet 1, each conical plug being received in the corresponding conical recess of an upper adjacent pallet.

Figure 4:
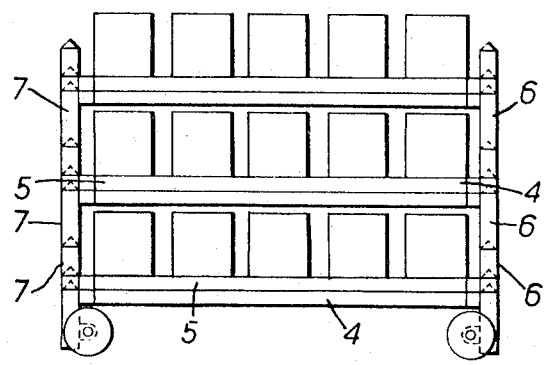
FIG. 4 is a side elevation of the trolley arranged in a configuration suitable for carrying larger articles.
Figure 5:
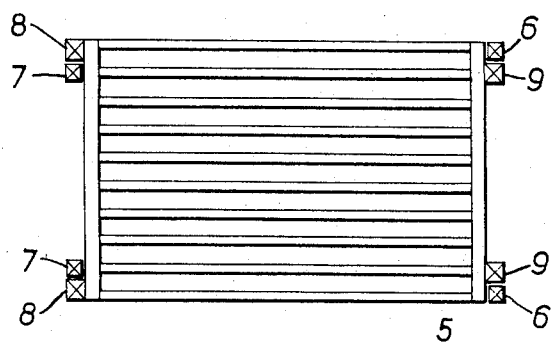
FIG. 5 is a plan of the trolley arranged as shown in FIG. 4.

When relatively taller articles are being carried as shown in FIG. 4, the pallets 2 are re-oriented about a vertical axis through 180° with respect to their orientation in FIG. 2. Thus the distance pieces 8 are no longer aligned with the distances 6, or the distance pieces 9 with the distance pieces 7. Instead, the distance pieces 9 of the pallets 2 lie side by side with the distance pieces 6, while the distance pieces 8 lie side by side with the distance pieces 7 of the pallets 1 (FIG. 5). In this manner the distance pieces 8 and 9 of the pallets 2 no longer form part of the load-bearing structure of the drying trolley; the pallets 2 rest upon the pallets 1, the load-bearing structure consisting of the distance pieces 6 and 7 of the pallets 1, which support the pallets 2.

What is claimed is:

1. In a trolley for drying bricks,
first pallets, and
second pallets, said first and second pallets being arranged in a stack with said second pallets alternating with said first pallets, each pallet comprising
an article-supporting frame which is substantially rectangular in configuration with pairs of opposite sides and which includes means defining an article-supporting surface, and
pairs of distance pieces rigidly mounted on opposite sides of each said frame, said distance pieces on one of said sides or each said frames being arranged at first identical corresponding positions proximate the corner of each said frame and said distance pieces on the other of said sides of each said frame being arranged at second identical corresponding positions also proximate the corner of each said frame but displaced by at least the width parallel to said opposite sides from said first positions of said distance pieces on said one side whereby upon reversal of said first pallet relative to a second pallet, said distance pieces of said first pallet are placed in a side-by-side relationship to the distance pieces of said second pallet, said distance pieces in each of said first pallets projecting both above and below said frame at right angles to said article-supporting surface, and said distance pieces in each of said second pallets being of a length approximately equal to the depth of said frame to which they are mounted, the arrangement being such that when the first and second pallets are in identical orientation as seen in plan, said distance pieces of each said second pallet are in alignment with said distance pieces of the adjacent upper and lower said first pallets so that each said second pallet is supported by its said distance pieces which are mounted vertically between said distance pieces of said first pallets and is spaced thereby from the said adjacent first pallets, and when the first and second pallet lie in reversed orientations, said distance pieces of each said second pallet lie out of alignment with said distance pieces of said adjacent upper and lower first pallets so that each said second pallet is supported on the frame of said lower adjacent first pallet.

2. A trolley as claimed in claim 1, wherein said distance pieces on said one side are disposed substantially at the corners of said frame at said one side and said distance pieces on said other side are displaced inward from the corners of said frame at said other side by a distance at least equal to the width along said sides of the distance pieces on said one side.

3. A trolley as claimed in claim 1 further comprising plug and socket connection means between adjacent distance pieces in the stack of pallets.

* * * * *